United States Patent
Cannon et al.

(10) Patent No.: US 7,844,756 B2
(45) Date of Patent: Nov. 30, 2010

(54) SELECTION OF DATA MOVER FOR DATA TRANSFER

(75) Inventors: David Maxwell Cannon, Tucson, AZ (US); Barry Fruchtman, Tucson, AZ (US); Yu-mei Una Hsiao, Tucson, AZ (US); Erick Christian Kissel, Tucson, AZ (US); Michael Harry Segapeli, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 11/625,727

(22) Filed: Jan. 22, 2007

(65) Prior Publication Data

US 2008/0177958 A1 Jul. 24, 2008

(51) Int. Cl.
*G06F 3/00* (2006.01)
*G06F 5/00* (2006.01)
(52) U.S. Cl. ........................................................ 710/38
(58) Field of Classification Search .................. None
See application file for complete search history.

(56) References Cited

U.S. PATENT DOCUMENTS

| | | | |
|---|---|---|---|
| 6,067,595 A | 5/2000 | Lindenstruth | |
| 6,453,354 B1 | 9/2002 | Jiang et al. | |
| 7,385,775 B2 | 6/2008 | Tanimura et al. | |
| 7,685,310 B2 * | 3/2010 | Ueoka et al. | 709/241 |
| 2004/0143637 A1 | 7/2004 | Koning et al. | |
| 2005/0041676 A1 | 2/2005 | Weinstein et al. | |
| 2005/0086363 A1 | 4/2005 | Ji | |
| 2005/0193245 A1 | 9/2005 | Hayden et al. | |
| 2006/0064405 A1 * | 3/2006 | Jiang et al. | 707/3 |
| 2006/0218289 A1 * | 9/2006 | Assad | 709/229 |
| 2007/0055702 A1 * | 3/2007 | Fridella et al. | 707/200 |
| 2007/0078961 A1 * | 4/2007 | Kumano et al. | 709/223 |
| 2007/0162656 A1 * | 7/2007 | Bryan et al. | 710/38 |

OTHER PUBLICATIONS

Patent Abstract for corresponding document EP 1667143 (Abstract for CN 1815611 not available), published Aug. 9, 2006, 1 pg.
Patent Abstract for corresponding document WO 9916200 (Abstract for CN 127985 not available), published Jan. 10, 2001.

* cited by examiner

*Primary Examiner*—Henry W Tsai
*Assistant Examiner*—Kris Rhu
(74) *Attorney, Agent, or Firm*—Rabindranath Dutta; Konrad Raynes and Victor LLP (57) ABSTRACT

Provided are a method, system, and article of manufacture wherein a set of communication paths between a plurality of data movers and a plurality of storage devices is maintained. A request to transfer data from a source storage device to a target storage device is received, wherein the source storage device and the target storage device are included in the plurality of storage devices. At least one data mover from the plurality of data movers is selected based on the set of communication paths, wherein the selected at least one data mover can transfer the data from the source storage device to the target storage device.

20 Claims, 6 Drawing Sheets

SELECTION OF DATA MOVER FOR DATA TRANSFER

BACKGROUND

1. Field

The disclosure relates to a method, system, and article of manufacture for the selection of data mover for data transfer.

2. Background

A storage management server may provide a repository for data objects that are backed up, archived, or migrated from client nodes in a computer network. The storage management server may store data objects in one or more storage pools and may use a database for tracking information about the stored data objects. After data objects have been stored, the storage management server may copy or move the objects within the same storage pool or to other pools.

Data transfer operations may be performed directly by the storage management server, wherein the storage management server stores, retrieves, moves, or copies data objects, depending on the desired operation. Data transfer operations may also be performed by using external data movers that are located outside the storage management server, and such data transfer operations performed by using external data movers may be referred to as outboard data transfer. In certain situations, it may be necessary or desirable for data transfer operations to be performed by using such external data movers. For example, in certain situations, the storage management server may not be able to directly access the storage devices and data objects stored thereon, and may depend on the external data movers for data transfer operations. In other situations, it may be desirable to off-load data transfer operations from the storage management server to the external data movers to reduce the processing load on the storage management server.

SUMMARY OF THE PREFERRED EMBODIMENTS

Provided are a method, system, and article of manufacture wherein a set of communication paths between a plurality of data movers and a plurality of storage devices is maintained. A request to transfer data from a source storage device to a target storage device is received, wherein the source storage device and the target storage device are included in the plurality of storage devices. At least one data mover from the plurality of data movers is selected based on the set of communication paths, wherein the selected at least one data mover can transfer the data from the source storage device to the target storage device.

In additional embodiments, the set of communication paths is a first set of communication paths. A second set of communication paths among the plurality of data movers is maintained, wherein the selecting of at least one data mover from the plurality of data movers is also based on the second set of communication paths in addition to being based on the first set of communication paths.

In yet additional embodiments, the selecting of the at least one data mover further comprises selecting the at least one data mover to be a first data mover with a communication path to both the source storage device and target storage device in preference to a second data mover and a third data mover that are directly connected, wherein the second data mover has a communication path to the source device and the third data mover has a communication path to the target device, and wherein the second data mover and the third data mover can include the first data mover.

In further embodiments, the selecting of the at least one data mover further comprises selecting the at least one data mover to be the second data mover and the third data mover that are directly connected in preference to a fourth data mover and a fifth data mover, wherein the fourth data mover and the fifth data mover in combination with at least one other data mover can transfer data from the source storage device to the target storage device, wherein the fourth data mover, the fifth data mover and the at least one other data mover can include one or more of the first, second, and third data movers.

In certain embodiments, the first set of communication paths and the second set of communication paths are maintained in a repository in a storage management server, wherein the storage management server selects the at least one data mover. The selected at least one data mover transfers the data from the source storage device to the target storage device, wherein the selecting of the at least one data mover further comprises prioritizing for selection the at least one data mover over one or more other data movers, based on one or more criteria for selection among the plurality of data movers, wherein the one or more criteria for selection are also maintained in the repository in the storage management server.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain data movers may allow for the possibility of data transfer between data movers. The data movers can work cooperatively to effect data transfer even in situations where no single data mover has access to both the source and target storage devices, and where the data transfer has to take place between the source storage device and the target storage device. For example, in certain situations, a first data mover may be able to access the source storage device and a second data mover may be able to access the target storage device. The first data mover reads data from the source storage device and sends data over a communication link to the second data mover, and the second data mover then writes to the target storage device.

Certain embodiments allow a selection of data movers to perform outboard data transfer. In certain embodiments in which only a single data mover has access to both source and target storage devices, the single data mover performs the outboard data transfer. In other embodiments in which a plurality of data movers may potentially perform the data transfer, a selection of one or more of the plurality of data movers may be used for performing the data transfer.

In certain embodiments in which there is no single data mover with access to both source and target devices, two or more data movers may be selected where the two or more data movers can cooperatively perform the data transfer. Certain embodiments allow the selection of a particular combination of data movers from a plurality of combinations of data movers.

Certain embodiments also allow selection of data movers for outboard data transfer in an environment that also allows dynamic sharing of storage devices by the data movers.

Exemplary Embodiments

Figure 1:
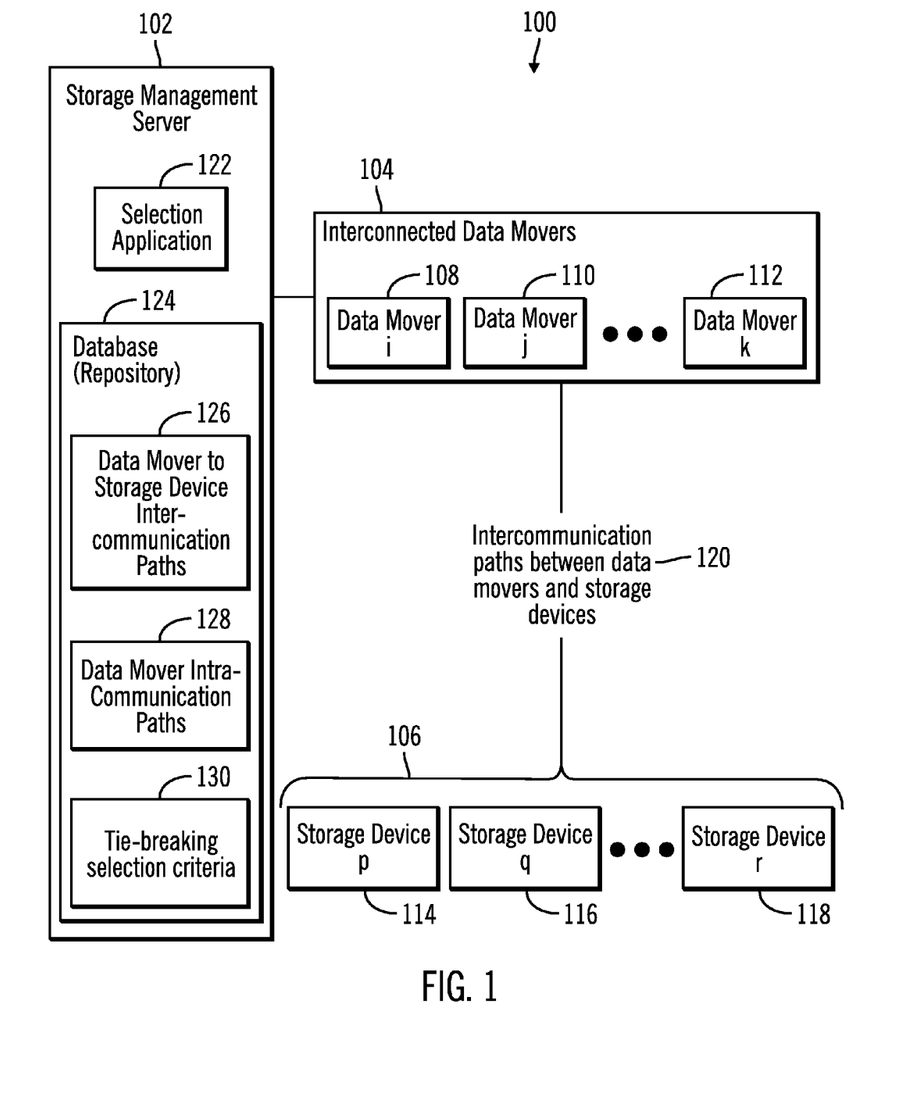
FIG. 1 illustrates a block diagram of a computing environment that includes a storage management server, interconnected data movers, and storage devices, in accordance with certain embodiments.

FIG. 1 illustrates a block diagram of a computing environment 100 that includes a storage management server 102, interconnected data movers 104, and a plurality of storage devices 106, in accordance with certain embodiments.

The storage management server 102 may comprise any suitable computational platform, including those presently known in the art, such as a personal computer, a workstation, a mainframe, a midrange computer, a network appliance, a palm top computer, a telephony device, a blade computer, a hand held computer, etc. The interconnected data movers 104 may include one or more external data movers, where in FIG. 1 exemplary data mover "i" 108, exemplary data mover "j" 110 and exemplary data mover "k" 112 have been shown. The interconnections among the interconnected data movers 104 may be performed differently in different embodiments. The storage devices 106 may comprise any suitable storage devices, including those presently known in the art, such as tape devices, disk drives, optical drives, etc. In FIG. 1 the storage devices 106 have been shown to include exemplary storage device "p" 114, exemplary storage device "q" 116, and exemplary storage device "r" 118.

The storage management server 102 is coupled to the interconnected data movers 104, and intercommunication paths 120 exist between the interconnected data movers 104 and the storage devices 106. For example, in an exemplary embodiment data mover "j" 110 may be have an intercommunication path to storage device "q" 116 and data mover "k" 112 may have an intercommunication path to storage device "r" 118. The intercommunication paths 120 between the interconnected data movers 104 and the storage devices 106 may be different in different embodiments. A data mover may have a connection to multiple storage devices and different data movers may have paths to the same storage device.

The storage management server 102 includes a selection application 122 and a database 124. The selection application 122 may be implemented in software, hardware, firmware or any combination thereof, and the selection application 122 selects one or more data movers from the interconnected data movers 104 to move data between a source storage device and a target storage device, where the source and target storage devices are included in the storage devices 106.

The database 124 is any suitable data repository known in the art and includes data structures 126, 128, 130 where data structure 126 stores the data mover to storage device intercommunication paths, where data structure 128 stores the data mover intra-communication paths, and data structure 130 stores tie-breaking selection criteria that are used for selecting one or more data movers that can be used for transferring data from a source storage device to a target storage device over one or more other data movers that can also be used for transferring data from the source storage device to the target storage device.

Therefore, FIG. 1 illustrates certain embodiments in which a selection application 122 is used to select one or more data movers from interconnected data movers 104, where the selected one or more data movers are used to transfer data from a source storage device to a target storage device, where the source and target storage devices are included in storage devices 106 and intercommunication paths exist between the interconnected data movers 104 and the storage devices 106. Certain embodiments presuppose a mechanism for determining the source and target storage locations (and therefore possible storage devices) for the data transfer operation. The source and/or target locations may be specified in each data transfer request or may be defined by policy.

While embodiments may or may not utilize storage pools for storing data, in certain embodiments that include storage pools a backup request may specify that data is to be transferred from a source disk device to a target storage pool based on a policy. The target storage pool may in turn indicate storage in a tape library containing one or more tape drives. In such embodiments, a restore request may require transfer of data from a source tape library containing one or more tape drives to a target disk device. Based on policy definitions, a reclamation operation may move data from one tape in a source storage pool to another target tape in the same storage pool. A tape library referenced by the storage pool may contain one or more tape drives that may be used as storage devices for the data transfer. A migration operation may move data from a source storage pool (and tape library) to a different target storage pool (same or different tape library). Each of the tape libraries may contain one or more tape drives that may be used as storage devices for the data transfer. A storage pool backup operation may copy data from a source storage pool (tape library) to a target copy storage pool (same or different tape library). Each of the tape libraries may contain one or more tape drives that may be used as the storage devices for the data transfer.

Figure 2:
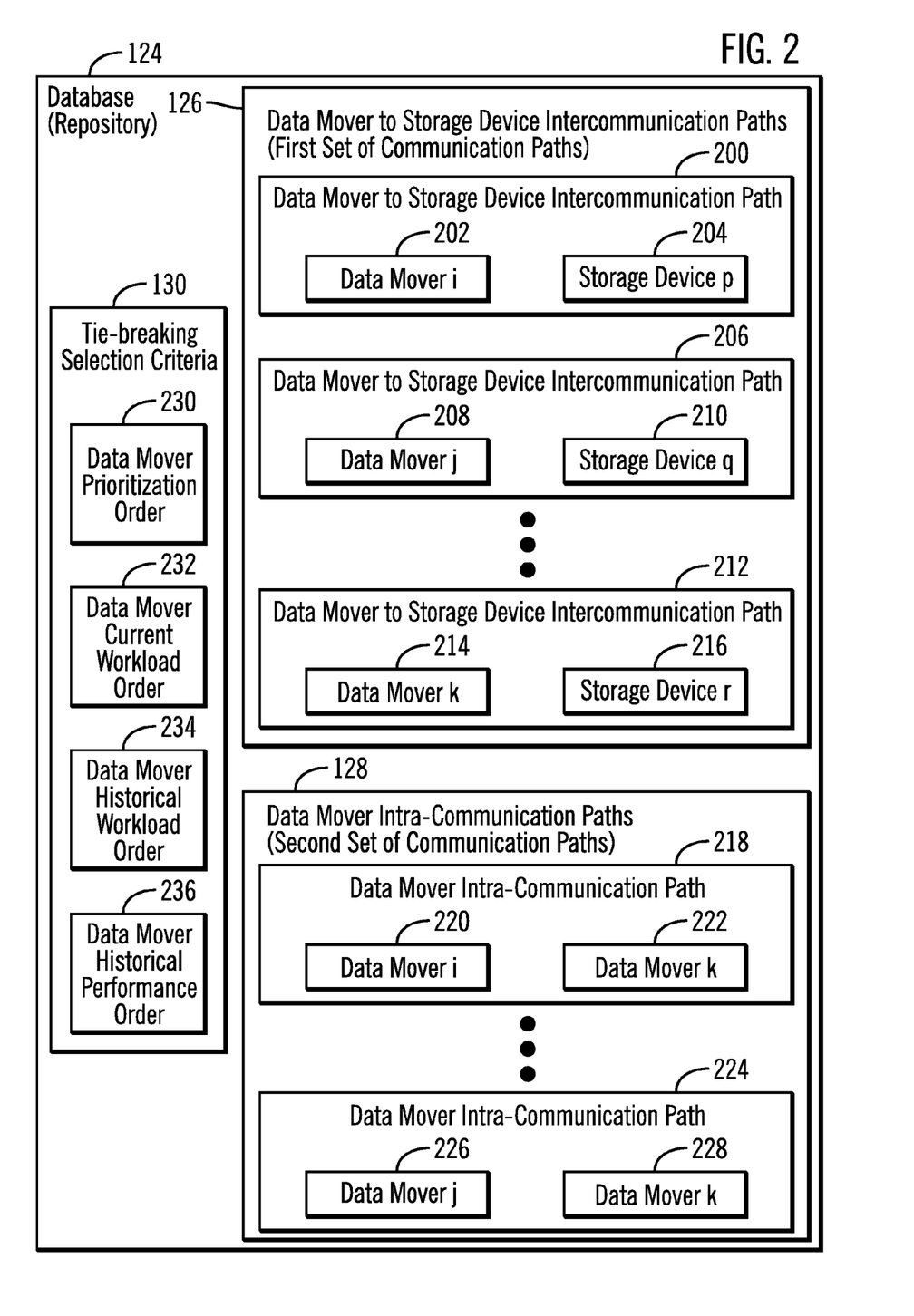
FIG. 2 illustrates a block diagram that shows elements of a database that is included in the storage management server, in accordance with certain embodiments.

FIG. 2 illustrates a block diagram that shows elements of the database 124 that is included in the storage management server 102 of the computing environment 100, in accordance with certain embodiments.

The data structures 126 that store the data mover to storage device intercommunication paths may in certain embodiments include exemplary data mover to storage device intercommunication paths 200, 206, 212. In certain exemplary embodiments, a data mover to storage device intercommunication path 200 is maintained between data mover "i" 202 and storage device "p" 204, a data mover to storage device intercommunication path 206 is maintained between data mover "j" 208 and storage device "q" 210, and a data mover to storage device intercommunication path 212 is maintained between data mover "k" 214 and storage device "r" 216. In other embodiments, the number of data mover to storage device intercommunication paths may be different from that shown in FIG. 2. In certain embodiments, the data mover to storage device intercommunication paths represented by data structure 126 may be referred to as a first set of communication paths. In certain embodiments, the database 124 may record paths that are defined for each combination of data mover and storage device. Each path definition may also contain parameters used by the data mover to access the storage device, such as a logical unit (LUN) or device name. The paths can be defined explicitly or may potentially be auto-detected by a data mover.

The data structures 128 that store the data mover intra-communication paths may in certain embodiments include exemplary data mover intra-communication paths 218, 224. In certain exemplary embodiments, a data mover intra-communication path 218 is maintained between data mover "i" 220 and data mover "k" 222, and a data mover intra-communication path 224 is maintained between data mover "j" 226 and data mover "k" 228. In other embodiments, the number of data mover intra-communication paths may be different from that shown in FIG. 2. In certain embodiments, the data mover intra-communication paths represented by data structure 128 may be referred to as a second set of communication paths. In certain embodiments, the data mover intra-communication paths can include information to allow data movers to establish a communication session, such as Internet Protocol (IP) address and password for other data movers. In certain embodiments, the system may be configured such that any data mover is assumed to have connectivity to any other data mover.

Certain embodiments provide for optimal selection of data movers and also allow a plurality of data movers to have shared access to the same storage devices. The data mover selection may be performed automatically, based on predetermined definitions and selection criteria, such as the tiebreaking selection criteria illustrated by data structure 130. The data structures 130 that represent the tie-breaking selection criteria may include elements representing data mover prioritization order 230, data mover current workload order 232, data mover historical workload order 234, data mover historical performance order 236, and other criteria (not shown) for selecting between different sets of data movers.

The data mover prioritization order 230 may be used to provide pre-assigned priority to the data movers. Each data mover can be assigned a priority, either through manual configuration by an administrator or based on some attribute of the data mover such as the processing power of the data mover. For even more granularity, a priority may be assigned to each path between a data mover and a storage device or to each path between data movers. Data movers (or paths) with more favorable priority may be preferred by the selection application 122.

The data mover current workload order 232 may be used to store the current workload on a data mover, where the workload may include the processing of other data transfer requests from the storage-management server 102. To achieve workload balancing, data movers with lower workload may be preferred by the selection application 122.

The data mover historical workload order 234 may represent the historical loading on a data mover. To achieve workload balancing, data movers with historically lower loading may be preferred by the selection application 122. This accounts for the possibility that the data mover may have a low workload at the beginning of the data transfer operation, but is likely to be tasked with additional work before the data transfer operation ends.

The data mover historical performance order 236 may represent the historical performance of each data mover 236. Data movers with higher performance may be preferred by the selection application 122. In certain embodiments, performance may also be incorporated into a preassigned priority.

In embodiments where multiple selection criteria are used, these multiple selection criteria may be applied in a specified sequence and criteria lower in the sequence may only be used as tiebreakers. For example, in the sequence shown above, preassigned priority may be the first consideration, and current workload may be used only if multiple candidate data movers have the same preassigned priority. An alternate approach to combining multiple selection criteria may be to use a hardcoded or configurable weighting for each criterion relative to other criteria. For example, the selection may be based 60% on preassigned priority and 40% on current workload.

Certain embodiments may select one or more data movers to participate in data transfer based on the following sequence of possibilities.

1. If the number of data movers with a path to both the source and target storage devices is one, then the selection application 122 selects the one data mover for performing the data transfer;
2. If the number of data movers with a path to both the source and target storage devices is more than one, then the selection application 122 selects a single data mover from the more than one data movers with a path to both the source and target devices. The selected data mover is used to perform the data transfer. The selected single data mover is the best data mover for the data transfer according to one or more predetermined criteria;
3. Otherwise, if there is at least one data mover with a path to the source storage device and at least one other data mover with a path to the target storage device and these data movers have a communication path to each other, the selection application 122 selects a single data mover with a path to the source storage device and a single data mover with a path to the target storage device, where a path exists between the selected single data mover with a path to the source storage device and the selected single data mover with a path to the target storage device. The two selected data movers are used for performing the data transfer; and
4. Otherwise, if there is at least one data mover with a path to the source storage device and at least one data mover with a path to the target storage device and these data movers can be interconnected via at least one intermediary data mover, the selection application 122 selects the best combination of data movers for the data transfer.

Figure 3:
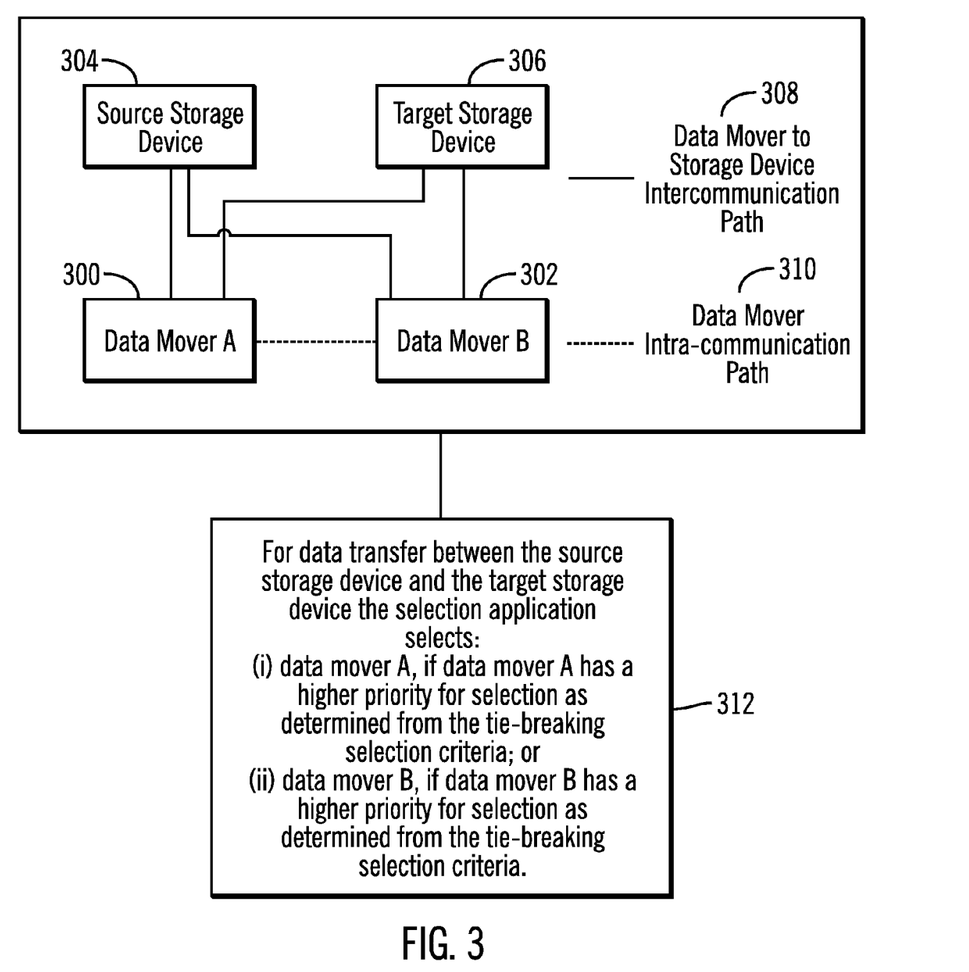
FIG. 3 illustrates a block diagram that shows the selection of data movers in a first exemplary configuration of data movers and storage devices, in accordance with certain embodiments.

FIG. 3 illustrates a block diagram that shows the selection of data movers in a first exemplary configuration of data movers and storage devices, in accordance with certain embodiments. In FIG. 3, two data movers, data mover A 300 and data mover B 302, each have access to the source storage device 304 and target storage device 306 for a specific data transfer operation via the data mover to storage device inter-communication paths (represented via solid lines shown in legend 308). There is also a communication path (represented via dashed line shown in legend 310) between data mover A 300 and data mover B 302.

In FIG. 3, for data transfer between the source storage device 304 and the target storage device 306 the selection application 122 selects (reference numeral 312):

(i) data mover A 300, if data mover A 300 has a higher priority for selection as determined from the tie-breaking selection criteria 130; or
(ii) data mover B 302, if data mover B 302 has a higher priority for selection as determined from the tie-breaking selection criteria 130.

Figure 4:
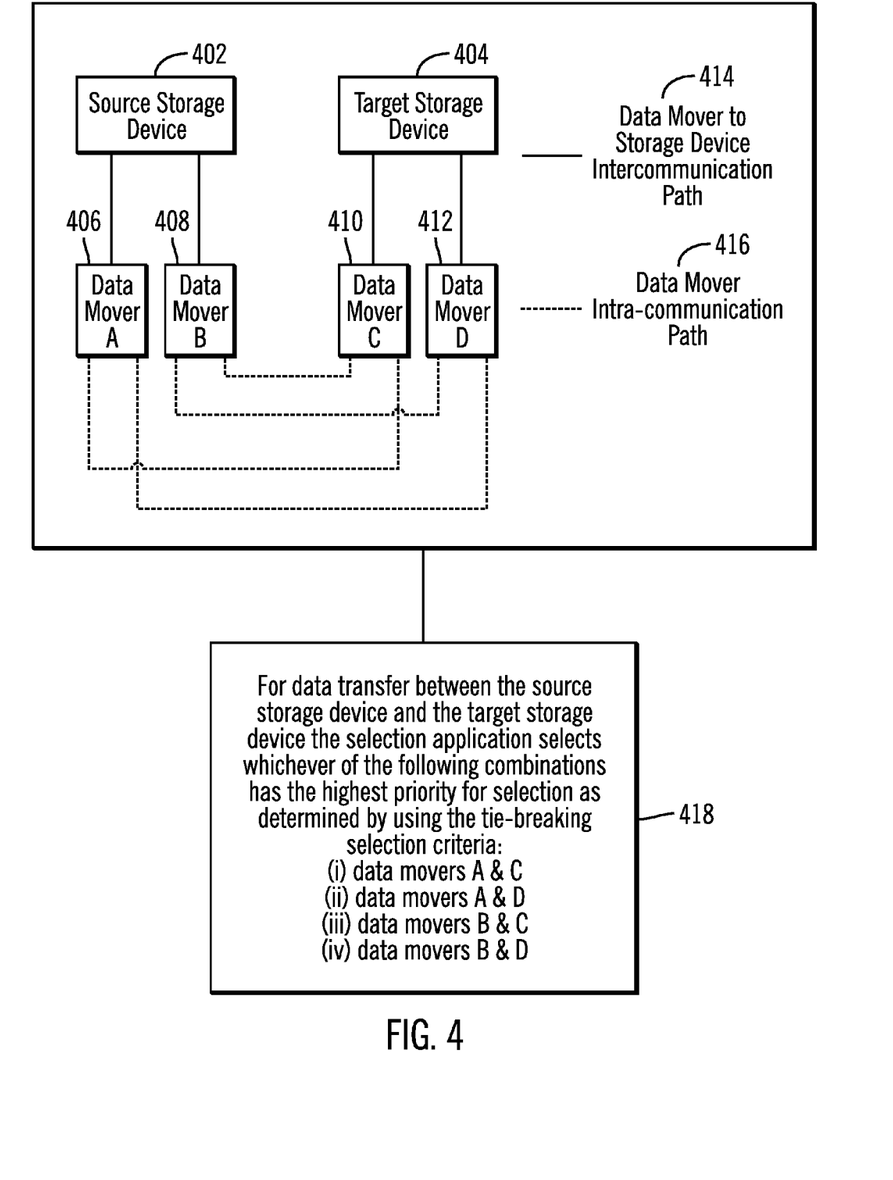
FIG. 4 illustrates a block diagram that shows the selection of data movers in a second exemplary configuration of data movers and storage devices, in accordance with certain embodiments.

FIG. 4 illustrates a block diagram that shows the selection of data movers in a second exemplary configuration of data movers and storage devices, in accordance with certain embodiments. FIG. 4 includes a source storage device 402, a target storage device 404, data mover A 406, data mover B 408, data mover C 410, data mover D 412 with the connections shown via solid and dashed lines according to the legends 414, 416. In FIG. 4, no data mover has access to both the source storage device 402 and the target storage device 404. However, data movers A 406 and B 408 each have access to the source storage device 402 and data movers C 410 and D 412 each have access to the target storage device 404. Additionally, communication paths exist between data movers A/B and C/D as shown in FIG. 4.

In FIG. 4, for data transfer between the source storage device 402 and the target storage device 404 the selection application 122 selects (reference numeral 418) whichever of the following combinations has the highest priority for selection as determined by using the tie-breaking selection criteria 130:
(i) data movers A 406 and C 410;
(ii) data movers A 406 and D 412;
(iii) data movers B 408 and C 410; and
(iv) data movers B 408 and D 412.

Figure 5:
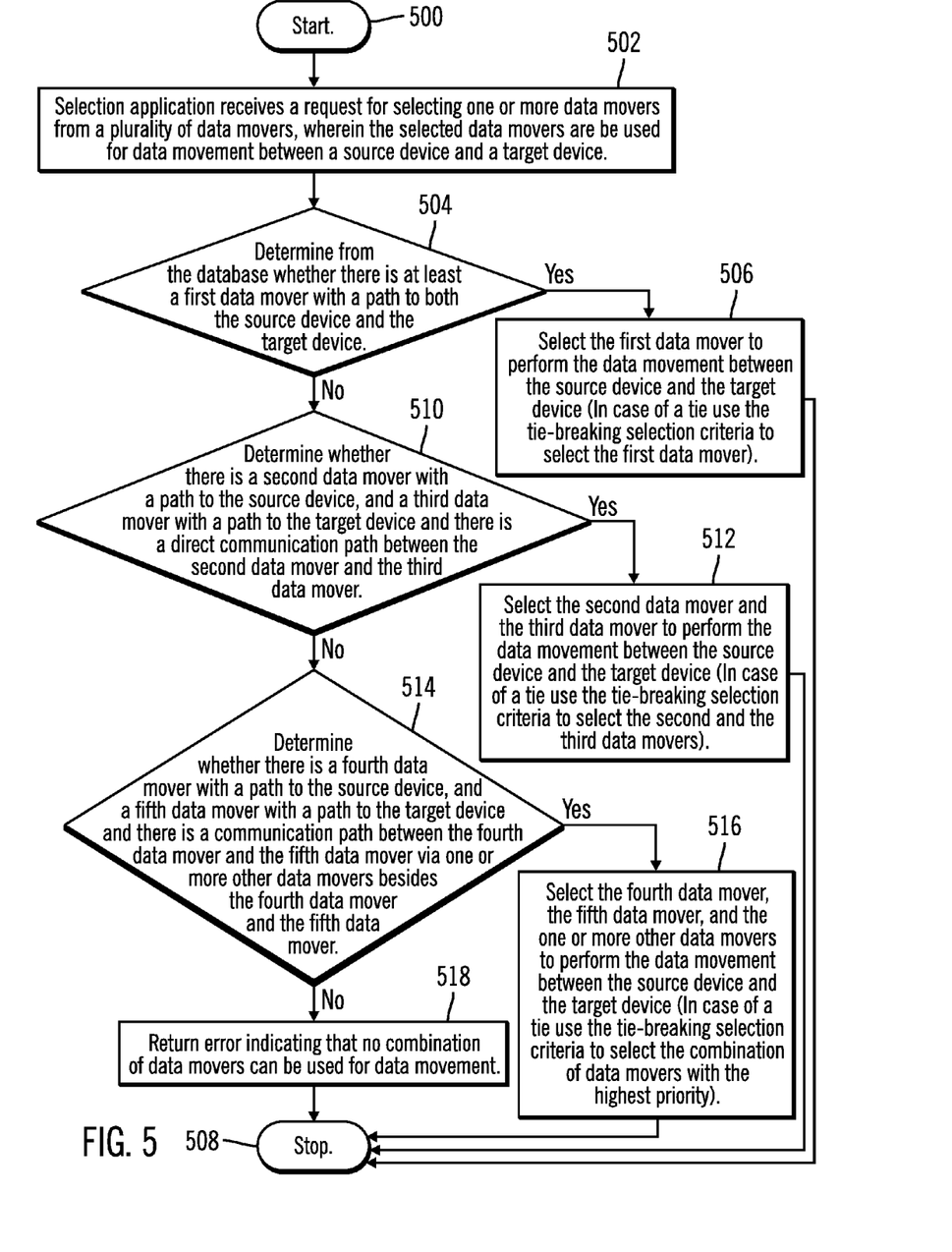
FIG. 5 illustrates operations for selecting data movers for data transfer between a source storage device and a target storage device, in accordance with certain embodiments.

FIG. 5 illustrates operations for selecting data movers for data transfer between a source storage device and a target storage device, in accordance with certain embodiments. The operations may be performed by the selection application 122 implemented in the storage management server 102.

Control starts at block 500, and proceeds to block 502 where the selection application 122 receives a request for selecting one or more data movers from a plurality of data movers 104, wherein the selected data movers are to be used for data movement between a source device and a target device. The source device and the target device are included in the storage devices 106.

The selection application 122 determines (at block 504) from the database 124 whether there is at least a first data mover with a path to both the source device and the target device. If so, then the selection application 122 selects (at block 506) the first data mover to perform the data movement between the source device and the target device and the process stops (at block 508). In case of a tie at block 506 (i.e., there is more than one suitable data mover), the selection application 122 uses the tie-breaking selection criteria 130 to select the first data mover.

If the selection application 122 determines (at block 504) from the database 124 that a first data mover with a path to both the source device and the target device is not present, then control proceeds to block 510. At block 510, the selection application 122 determines whether there is a second data mover with a path to the source device, whether there is a third data mover with a path to the target device, and whether there is a direct communication path between the second data mover and the third data mover. If so, then the selection application 122 selects (at block 512) the second data mover and the third data mover to perform the data movement between the source device and the target device and the process stops (at block 508). At block 512, in case of a tie the selection application 122 uses the tie-breaking selection 130 to select the second and the third data movers.

In case the determination is "No" at block 510, then control proceeds to block 514, where the selection application 122 determines whether there is a fourth data mover with a path to the source device, and a fifth data mover with a path to the target device and there is a communication path between the fourth data mover and the fifth data mover via one or more other data movers besides the fourth data mover and the fifth data mover. If so, the selection application 122 selects (at block 516) the fourth data mover, the fifth data mover, and the one or more other data movers to perform the data movement between the source device and the target device. In case of a tie the selection application 122 uses the tie-breaking selection criteria 130 to select the combination of data movers with the highest priority.

In case the determination is "No" at block 514, then control proceeds to block 518 where the selection application 122 returns an error indicating that no combination of data movers can be used for the requested data movement between the source device and the target device and the process stops (at block 508).

In certain embodiments, if more than two sets of data movers are eligible, the best set is selected. This is done by considering pairs of source and target data movers, and by determining the minimal number of intermediate data movers to link the source and target. If multiple sets have the same number of intermediate data movers, the selection criteria described earlier may be used to select the best set. In practice, the number of intermediate data movers may be limited to some small number, as it is reasonable to expect that the system is likely to be configured with paths so as to minimize the total number of required data movers for data transfer.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture may comprise a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
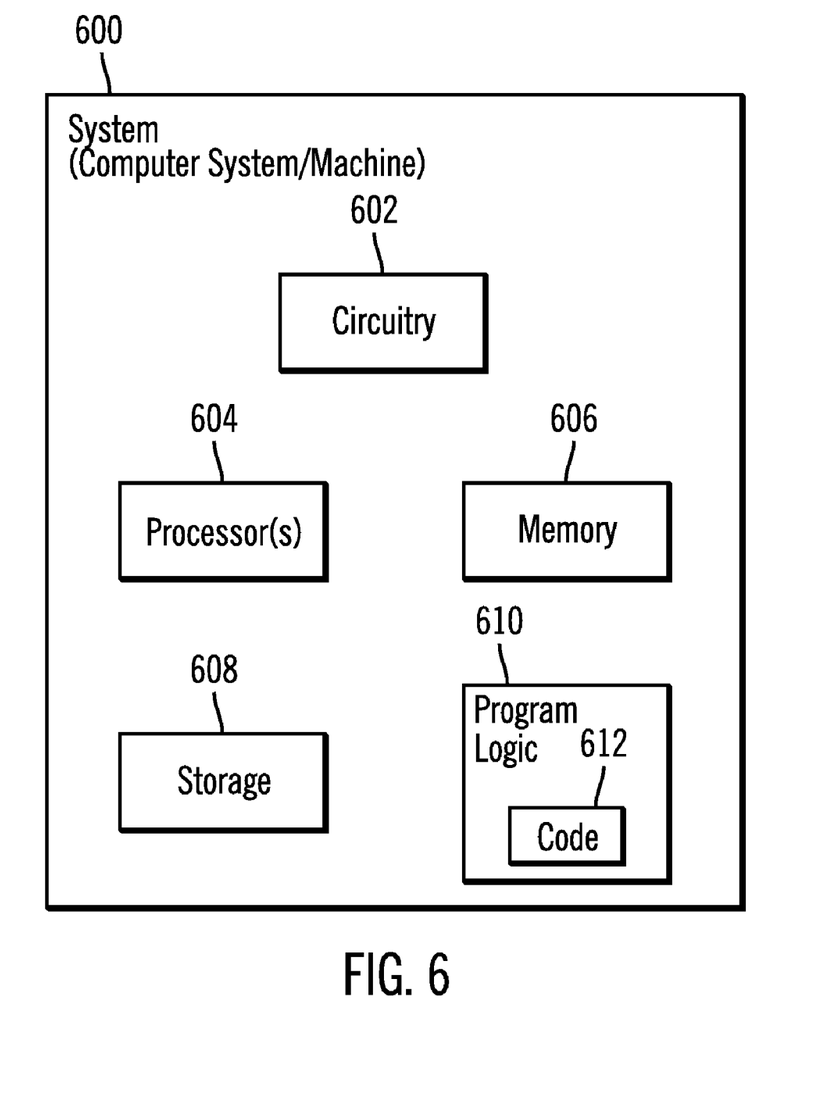
FIG. 6 illustrates a block diagram that shows certain elements that may be included in the storage management server, in accordance with certain embodiments.

FIG. 6 illustrates a block diagram that shows certain elements that may be included in the storage management server 102, in accordance with certain embodiments. The storage management server 102 may also be referred to as a system, and may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
maintaining a set of communication paths between a plurality of data movers and a plurality of storage devices;
maintaining a prioritization order of the plurality of data movers based on processing power of the plurality of data movers, and assigning priorities to selected communication paths between selected data movers and selected storage devices;
in response to maintaining the prioritization order and the assigned priorities, receiving a request to transfer data from a source storage device to a target storage device, wherein the source storage device and the target storage device are included in the plurality of storage devices;
selecting at least one data mover from the plurality of data movers based on the set of communication paths, the maintained prioritization order, the assigned priorities, current workload order of the plurality of data movers, historical workload order of the plurality of data movers, and historical performance order of the plurality of data movers, wherein the selected at least one data mover can transfer the data from the source storage device to the target storage device; and transferring, by the selected at least one data mover, the data from the source storage device to the target storage device.

2. The method of claim 1, wherein the set of communication paths is a first set of communication paths, further comprising:

maintaining a second set of communication paths among the plurality of data movers, wherein the selecting of at least one data mover from the plurality of data movers is also based on the second set of communication paths in addition to being based on the first set of communication paths.

3. The method of claim 2, wherein the selecting of the at least one data mover further comprises:

selecting the at least one data mover to be a first data mover with a communication path to both the source storage device and target storage device in preference to a second data mover and a third data mover that are directly connected, wherein the second data mover has a communication path to the source device and the third data mover has a communication path to the target device, and wherein the second data mover and the third data mover can include the first data mover.

4. The method of claim 3, wherein the selecting of the at least one data mover further comprises:

selecting the at least one data mover to be the second data mover and the third data mover that are directly connected in preference to a fourth data mover and a fifth data mover, wherein the fourth data mover and the fifth data mover in combination with at least one other data mover can transfer data from the source storage device to the target storage device, wherein the fourth data mover, the fifth data mover and the at least one other data mover can include one or more of the first, second, and third data movers.

5. The method of claim 1, wherein the prioritization order of the plurality of data movers is configured by an administrator.

6. A system for controlling a plurality of data movers and a plurality of storage devices, the system comprising:

a memory; and a processor coupled to the memory, wherein the processor executes operations, the operations comprising:

maintaining a set of communication paths between the plurality of data movers and the plurality of storage devices;

maintaining a prioritization order of the plurality of data movers based on processing power of the plurality of data movers, and assigning priorities to selected communication paths between selected data movers and selected storage devices;

in response to maintaining the prioritization order and the assigned priorities, receiving a request to transfer data from a source storage device to a target storage device, wherein the source storage device and the target storage device are included in the plurality of storage devices;

selecting at least one data mover from the plurality of data movers based on the set of communication paths, the maintained prioritization order, the assigned priorities, current workload order of the plurality of data movers, historical workload order of the plurality of data movers, and historical performance order of the plurality of data movers, wherein the selected at least one data mover can transfer the data from the source storage device to the target storage device; and transferring, by the selected at least one data mover, the data from the source storage device to the target storage device.

7. The system of claim 6, wherein the set of communication paths is a first set of communication paths, the operations further comprising:

maintaining a second set of communication paths among the plurality of data movers, wherein the selecting of at least one data mover from the plurality of data movers is also based on the second set of communication paths in addition to being based on the first set of communication paths.

8. The system of claim 7, wherein the selecting of the at least one data mover further comprises:

selecting the at least one data mover to be a first data mover with a communication path to both the source storage device and target storage device in preference to a second data mover and a third data mover that are directly connected, wherein the second data mover has a communication path to the source device and the third data mover has a communication path to the target device, and wherein the second data mover and the third data mover can include the first data mover.

9. The system of claim 8, wherein the selecting of the at least one data mover further comprises:

selecting the at least one data mover to be the second data mover and the third data mover that are directly connected in preference to a fourth data mover and a fifth data mover, wherein the fourth data mover and the fifth data mover in combination with at least one other data mover can transfer data from the source storage device to the target storage device, wherein the fourth data mover, the fifth data mover and the at least one other data mover can include one or more of the first, second, and third data movers.

10. The system of claim 6, wherein the prioritization order of the plurality of data movers is configured by an administrator.

11. An article of manufacture including code, wherein the code when executed by a computer causes operations, the operations comprising:

maintaining a set of communication paths between a plurality of data movers and a plurality of storage devices;

maintaining a prioritization order of the plurality of data movers based on processing power of the plurality of data movers, and assigning priorities to selected communication paths between selected data movers and selected storage devices;

in response to maintaining the prioritization order and the assigned priorities, receiving a request to transfer data from a source storage device to a target storage device, wherein the source storage device and the target storage device are included in the plurality of storage devices;

selecting at least one data mover from the plurality of data movers based on the set of communication paths, the maintained prioritization order, the assigned priorities, current workload order of the plurality of data movers, historical workload order of the plurality of data movers, and historical performance order of the plurality of data movers, wherein the selected at least one data mover can transfer the data from the source storage device to the target storage device; and transferring, by the selected at least one data mover, the data from the source storage device to the target storage device.

12. The article of manufacture of claim 11, wherein the set of communication paths is a first set of communication paths, the operations further comprising:

maintaining a second set of communication paths among the plurality of data movers, wherein the selecting of at least one data mover from the plurality of data movers is also based on the second set of communication paths in addition to being based on the first set of communication paths.

13. The article of manufacture of claim 12, wherein the selecting of the at least one data mover further comprises:

selecting the at least one data mover to be a first data mover with a communication path to both the source storage device and target storage device in preference to a second data mover and a third data mover that are directly connected, wherein the second data mover has a communication path to the source device and the third data mover has a communication path to the target device, and wherein the second data mover and the third data mover can include the first data mover.

14. The article of manufacture of claim 13, wherein the selecting of the at least one data mover further comprises:

selecting the at least one data mover to be the second data mover and the third data mover that are directly connected in preference to a fourth data mover and a fifth data mover, wherein the fourth data mover and the fifth data mover in combination with at least one other data mover can transfer data from the source storage device to the target storage device, wherein the fourth data mover, the fifth data mover and the at least one other data mover can include one or more of the first, second, and third data movers.

15. The article of manufacture of claim 11, wherein the prioritization order of the plurality of data movers is configured by an administrator.

16. A method for deploying computing infrastructure, comprising integrating computer-readable code into a computing system, wherein the code in combination with the computing system is capable of performing:

maintaining a set of communication paths between a plurality of data movers and a plurality of storage devices;

maintaining a prioritization order of the plurality of data movers based on processing power of the plurality of data movers, and assigning priorities to selected communication paths between selected data movers and selected storage devices;

in response to maintaining the prioritization order and the assigned priorities, receiving a request to transfer data from a source storage device to a target storage device, wherein the source storage device and the target storage device are included in the plurality of storage devices;

selecting at least one data mover from the plurality of data movers based on the set of communication paths, the maintained prioritization order, the assigned priorities, current workload order of the plurality of data movers, historical workload order of the plurality of data movers, and historical performance order of the plurality of data movers, wherein the selected at least one data mover can transfer the data from the source storage device to the target storage device; and transferring, by the selected at least one data mover, the data from the source storage device to the target storage device.

17. The method for deploying computing infrastructure of claim 16, wherein the set of communication paths is a first set of communication paths, wherein the code in combination with the computing system is capable of performing:

maintaining a second set of communication paths among the plurality of data movers, wherein the selecting of at least one data mover from the plurality of data movers is also based on the second set of communication paths in addition to being based on the first set of communication paths.

18. The method for deploying computing infrastructure of claim 17, wherein the selecting of the at least one data mover further comprises:

selecting the at least one data mover to be a first data mover with a communication path to both the source storage device and target storage device in preference to a second data mover and a third data mover that are directly connected, wherein the second data mover has a communication path to the source device and the third data mover has a communication path to the target device, and wherein the second data mover and the third data mover can include the first data mover.

19. The method for deploying computing infrastructure of claim 18, wherein the selecting of the at least one data mover further comprises:

selecting the at least one data mover to be the second data mover and the third data mover that are directly connected in preference to a fourth data mover and a fifth data mover, wherein the fourth data mover and the fifth data mover in combination with at least one other data mover can transfer data from the source storage device to the target storage device, wherein the fourth data mover, the fifth data mover and the at least one other data mover can include one or more of the first, second, and third data movers.

20. The method for deploying computing infrastructure of claim 16, wherein the prioritization order of the plurality of data movers is configured by an administrator.

* * * * *